United States Patent [19]

Signer

[11] 4,334,720
[45] Jun. 15, 1982

[54] SPLIT-INNER-RING BALL BEARING WITH LUBRICATION STRUCTURE

[75] Inventor: Hans R. Signer, Fullerton, Calif.

[73] Assignee: Industrial Tectonics, Inc., Ann Arbor, Mich.

[21] Appl. No.: 120,448

[22] Filed: Feb. 11, 1980

[51] Int. Cl.³ .................... F16C 33/66; F16C 37/00
[52] U.S. Cl. .............................. 308/187; 308/189 R
[58] Field of Search ............... 308/187, 189 R, 216, 308/188, 196, 189 A

[56] References Cited

U.S. PATENT DOCUMENTS

| | | | |
|---|---|---|---|
| 3,504,955 | 4/1970 | Bailey | 308/187 |
| 3,528,711 | 9/1970 | Atkinson | 308/187 |
| 4,194,797 | 3/1980 | Hörmann et al. | 308/187 |

*Primary Examiner*—Lenard A. Footland
*Attorney, Agent, or Firm*—Blanchard, Flynn, Thiel, Boutell & Tanis

[57] ABSTRACT

A split-inner-ring ball bearing construction is provided with means for feeding proportioned amounts of lubricant from a single source thereof to several different locations in the bearing without using restricting orifices in the lubricant flow paths.

14 Claims, 8 Drawing Figures

SPLIT-INNER-RING BALL BEARING WITH LUBRICATION STRUCTURE

FIELD OF THE INVENTION

The invention relates to a split-inner-ring ball bearing having improved means for providing lubrication and cooling of the internal portions thereof, wherein the split inner ring (inner race) is provided with manifold chambers, grooves and bores interconnected for transmitting lubricant in a proportioned manner to several different internal locations in the ball bearing from a single remote supply source of the lubricant.

Antifriction rolling-element bearings have been known for a long time and many different designs are known. However, without proper lubrication and cooling during operation, the useful life of the bearings is considerably reduced.

Conventional methods of supplying lubricant to the rolling contact surfaces of a bearing by jets work well for low and medium speed bearing applications. At high operating speeds, however, bearings perform better when the lubricant is introduced through passages within the bearing rings, such as through the split of a split-inner-ring ball bearing.

Due to churning effects, the power demand of a high speed bearing increases when the flow of lubricant into the bearing is increased. It may, therefore, be desirable or necessary to introduce only a limited amount of oil into the bearing cavities while the balance of the available lubricant is used to cool the exterior bearing surfaces (the I.D. of the inner ring and the O.D. of the outer ring) to carry off the heat generated within the bearing.

This invention provides improved structure for effecting lubrication and ring cooling of a split-inner-ring ball bearing. It provides means for feeding proportioned amounts of lubricant from a single source thereof to several different locations in the bearing without using restricting orifices in the lubricant flow paths.

Prior designs of split-inner-ring ball bearings incorporating means for lubricating the internal parts of the bearings are not completely satisfactory due to the inability to supply defined amounts of lubricant to various internal parts of the bearings without providing a multitude of lubricant supply sources or providing restricting orifices which are prone to become plugged during use, thereby leading to failure of the bearing.

Accordingly, the objects of the invention are:

to provide a split-inner-ring ball bearing in which the split inner ring has internal passageways effective to divert controlled amounts of lubricant from a single external source to several different internal parts of the bearing, such as the ball members and the retainer contact surfaces thereof, for lubricating and cooling such internal parts, and for cooling the bearing inner ring surfaces, and to provide a split-inner-ring ball bearing, as aforesaid, in which the proportioning of the lubricant flow is effected without using restricting orifices in the passageways.

Other objects and purposes of the invention will be apparent to persons skilled in the art upon reading the following specification and inspecting the accompanying drawings.

DESCRIPTION OF PRIOR ART

It has been conventional to supply lubricant to the internal parts of split-inner-ring ball bearings. FIGS. 1 to 4 illustrate prior art split-inner-ring ball bearings incorporating lubricant supply means. FIG. 1 shows a split inner ring 3 provided with a circumferential annular groove 12 in its inner wall. The groove 12 communicates with a radial passage 11 in the shaft 8. A plurality of circumferentially spaced radial bores 15 extend outwardly from the groove 12 to the inner ball raceway. FIG. 2 shows another split-inner-race ball bearing provided with an annular manifold 9A in the shaft connected by axial grooves 13A to the groove 12A which is connected to passageways 15A to provide lubricant to the inner ball raceway. Only one internal location, i.e., the inner raceway, of the bearing can be lubricated by the designs of FIGS. 1 and 2. FIG. 3 shows a split-inner-ring ball bearing in which the inner wall of the split inner ring is provided with axially spaced-apart annular manifolds 12B, 12B-1 and 12B-2 communicating with radial passageways 14B, 15B and 16B, respectively, which extend to the internal parts, i.e., the retainer contact surfaces and the inner raceway, of the bearing for supplying lubricant thereto. However, separate individual external lubricant supply means 11B, 11B-1 and 11B-2 are required to communicate with the manifolds 12B, 12B-1 and 12B-2, respectively, to supply the internal moving parts of the bearing with the desired amounts of lubricant. FIG. 4 shows another split-inner-ring ball bearing having a central annular manifold 12C connected with the passageways 14C, 15C and 16C to the internal parts of the bearing to provide lubricant to said parts. However, the flow cannot reliably be proportioned except by restricting the passageways, which is not desirable.

U.S. Pat. Nos. 3,528,711, 3,243,243 and 3,269,786 disclose ball bearings provided with means for supplying lubricant through the inner race thereof.

DESCRIPTION OF PREFERRED EMBODIMENT

Figure 1:
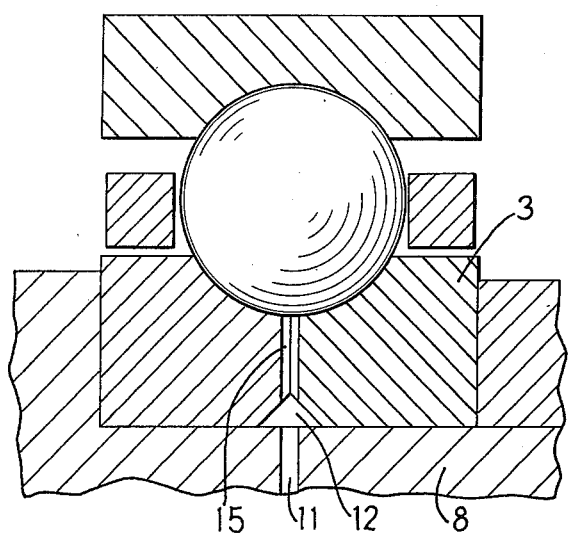
FIG. 1 is a sectional view of a prior art ball bearing embodying a first embodiment of lubrication means.
Figure 2:
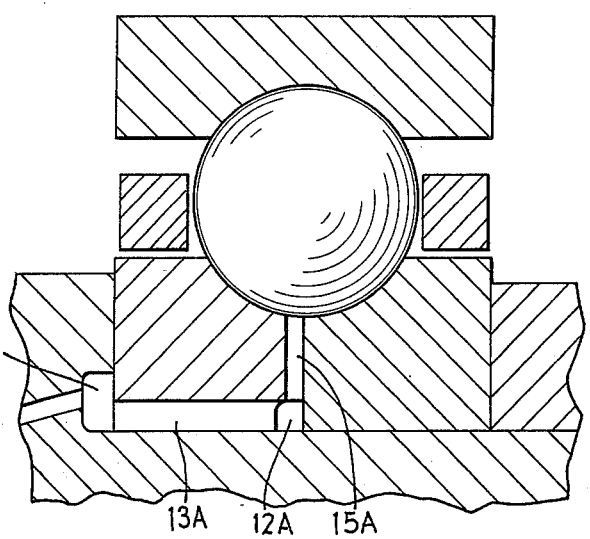
FIG. 2 is a sectional view of another prior art ball bearing embodying a second embodiment of lubrication means.
Figure 3:
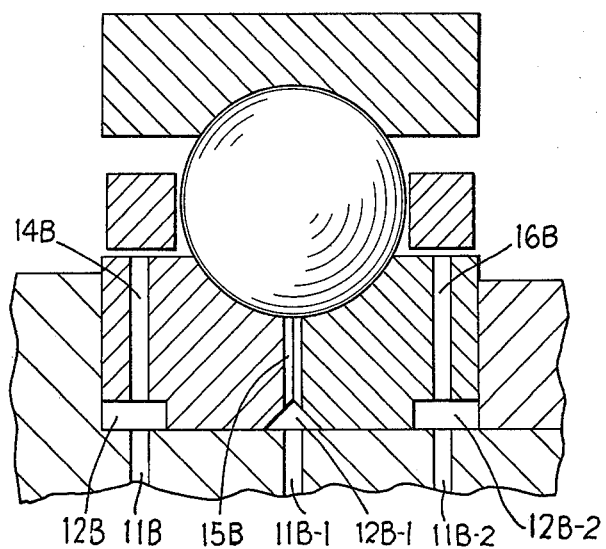
FIG. 3 is a sectional view of yet another prior art ball bearing embodying a third embodiment of lubrication means.
Figure 4:
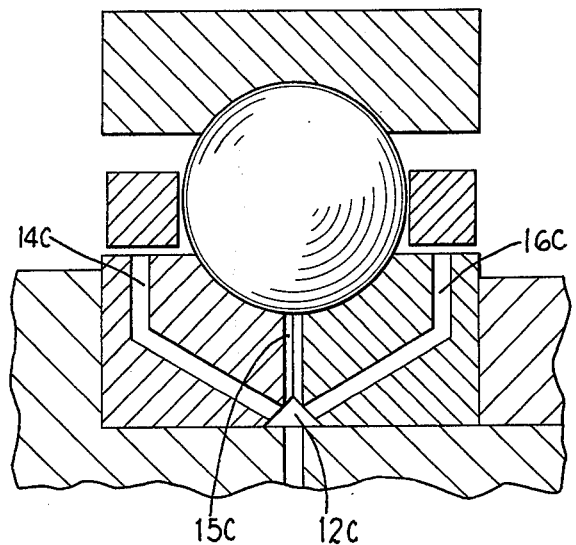
FIG. 4 is a sectional view of still another prior art ball bearing embodying a fourth embodiment lubrication means.
Figure 5:
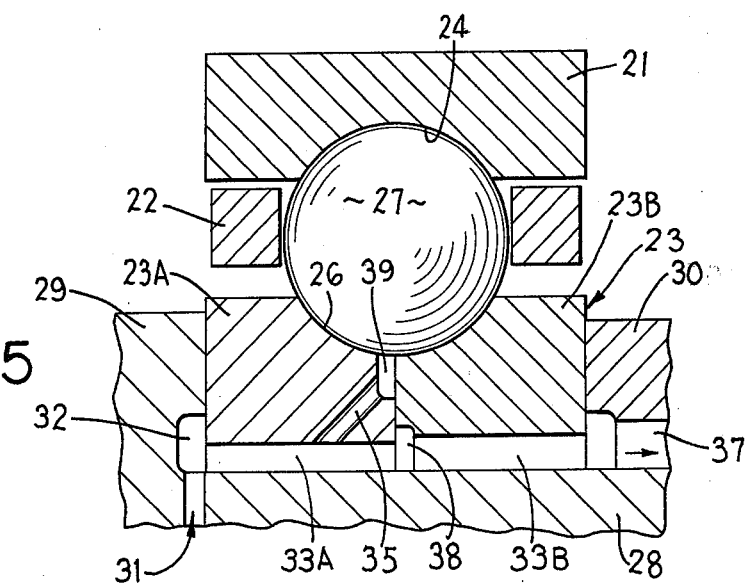
FIG. 5 is a sectional view of a split-inner-ring ball bearing embodying a first embodiment of the invention.
Figure 6:
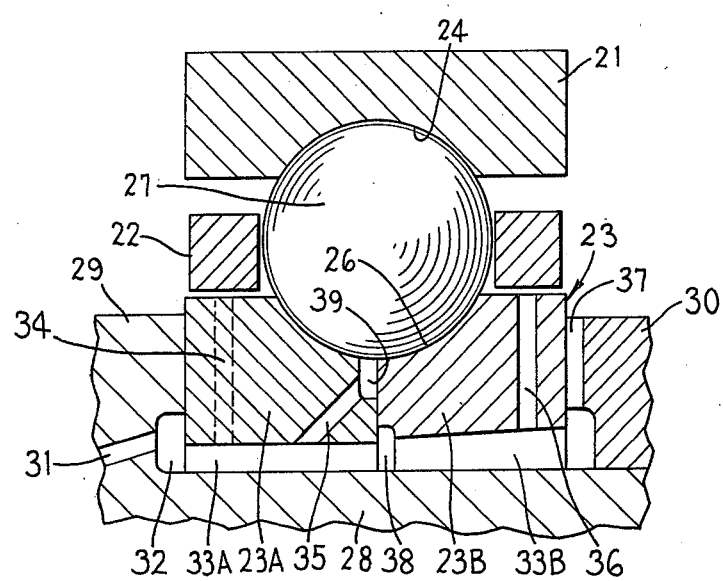
FIG. 6 is a sectional view of a split-inner-ring ball bearing embodying a second embodiment of the invention.
Figure 7:
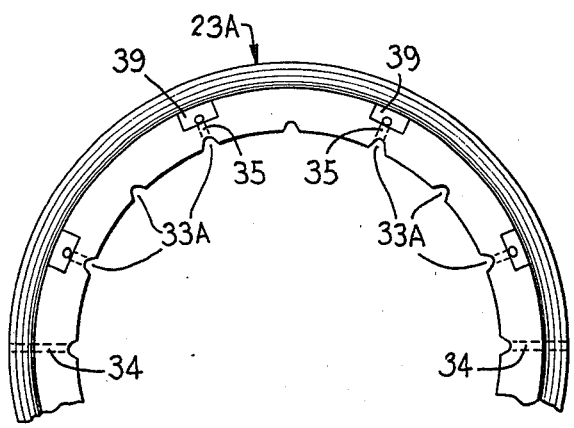
FIG. 7 is an end view of one ring of the split inner ring of the ball bearing of FIG. 6.
Figure 8:
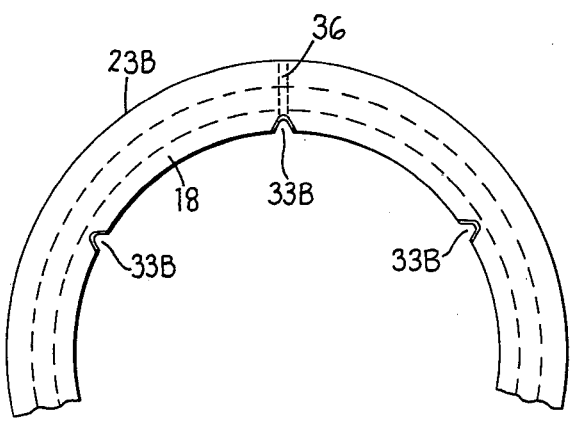
FIG. 8 is an end view of the other ring of the split inner ring of the ball bearing of FIG. 6.

Referring now to the drawings, preferred embodiments of the invention are shown in FIGS. 5–8. The embodiment of FIG. 5 is similar to the embodiment of FIGS. 6–8, except that the passageways 34 and 36 of FIGS. 6–8 are omitted in the embodiment of FIG. 5, the grooves 37 extend axially in FIG. 5 and radially in FIG. 6 and the passageway 31 extends radially in FIG. 5 and axially in FIG. 6. Accordingly, the following description will proceed with reference to both embodiments and the same reference numerals will be applied to the same parts in both embodiments.

The ball bearing has an outer ring 21 surrounding a ball retainer 22 which in turn surrounds a split inner ring 23. The split inner ring 23 consists of two rings 23A and 23B, respectively, whose adjacent axial end surfaces abut against each other in a manner well known to those skilled in the art. The outer and inner rings 21 and 23 are provided with raceways 24 and 26, respectively, for receiving bearing balls 27 in a conventional manner. The bearing is mounted on the shaft 28 in any conventional way, for example, by holding the inner ring 23 between the shoulder 29 on the shaft and the locknut 30 as shown in FIG. 5.

The shaft 28 is provided with a passage 31 which communicates at one end with a lubricant supply reservoir or scoop (not shown) and which communicates at the other end with an annular manifold 32 which is formed at the interface between the shaft and one axial end of the split inner race 23. A plurality of circumferentially spaced-apart, axially extending grooves 33A are formed in the radially inner surface of the ring 23A and extend between the axial ends thereof. The ring 23B of the inner race 23 has a plurality of circumferentially spaced-apart, axially extending grooves 33B in its radial inner surface. An annular chamber 38 is formed in the inner axial end surface of the ring 23B adjacent the radially inner side thereof. The chamber 38 communicates with the inner axial ends of the grooves 33A in the ring 23A. The grooves 33B extend from the chamber 38 to the outer axial end of ring 23. The annular chamber 38 is provided so that the axial grooves 33A and 33B need not be in angular alignment for proper functioning of the lubrication structure, according to the invention. The grooves 33B have a greater radial depth than the grooves 33A and, if desired, the radial depth of grooves 33A and/or 33B can progressively increase towards the axial outer end of the ring 23B.

In the embodiment of FIGS. 6–8 only, a plurality of radially extending passageways 34 and a plurality of radially extending passageways 36 extend from grooves 33A and 33B, respectively, and to the radially outer surfaces of the rings 23A and 23B, for supplying lubricant to the inner surfaces of the retainer 22 on opposite sides of the bearing balls.

In both the embodiment of FIG. 5 and the embodiment of FIGS. 6–8, a plurality of axially inclined outwardly extending passageways 35 extend from other ones of the grooves 33A and communicate at their outer ends with radial recesses 39. The recesses 39 are formed in the inner axial end surface of ring 23 and extend to the raceway 26 of the inner ring 23 as shown in FIGS. 5, 6 and 7. The locknut 30 is provided with grooves 37 to allow excess lubricant to escape and return to the lubricant supply reservoir or to lubricate adjacent machine elements.

The rings 23A and 23B can be designed to have any suitable number of axial grooves 33A and 33B and passageways 35 (FIGS. 5–8) and passageways 34 and 36 (FIGS. 6–8) in order to supply desired proportioned amounts of lubricant to the ball raceway and the retainer and/or to channel the oil along the exterior bearing surfaces for ring cooling. The number of grooves 33A need not be equal to the number of grooves 33B and usually the number of grooves 33B is less than the number of grooves 33A. The numbers of grooves 33A and 33B are selected to channel desired portions of the supplied lubricant to the internal parts of the bearing. The lubrication and cooling requirements for different internal parts of ball bearings are different. Normally, more lubricant must be supplied to the inner ball race, in comparison with the inner surfaces of the ball retainer. For example, in the illustrated embodiment of the invention there are sixteen grooves 33A and six grooves 33B. In the illustrated embodiment, there are eight equally spaced passageways 35, two passageways 34 which are spaced 180° apart and two passageways 36 which also are spaced 180° apart. It will be noted that each of the passageways 34, 35 and 36 communicates with different ones of the grooves 33A and 33B and the passageways 34, 35 and 36 are of sufficient size for not restricting the lubricant flow assigned to them. The proportioning of the amounts of lubricant supplied to different parts of the bearing is determined principally by the number of axial grooves 33A and 33B, and the number of passageways 34, 35 and 36 that communicate with the respective bearing parts.

It will be noticed that the apparatus does not use restricting orifices for metering lubricant flow. This is advantageous because restricted orifices are vulnerable to plugging, for example, by coaked oil or extraneous contaminants that might be present in the lubricant.

OPERATION

Although the operations of both embodiments of the ball bearing, according to the invention, are believed to be evident from the foregoing description, a detailed discussion of the operation of the preferred embodiment of FIGS. 6–8 of the invention will be given to insure a complete understanding of the invention. In operation, lubricant is supplied through the passage 31 to the annular manifold 32. Due to centrifugal force generated by the rotation of the shaft 28, the lubricant is then pumped from the manifold 32 to each of the grooves 33A and thence flows outwardly from certain ones of the grooves 33A through the passageways 34 and 35, to the retainer 22 and through the recesses 39 to the ball raceway 26. Because passageways 34 and 35 each communicate with different ones of the grooves 33A, which are of about the same size, approximately equal amounts of lubricant will flow through each of the passageways 34 and 35. The total amount of lubricant reaching the leftward side of the retainer and the ball raceway, respectively, can be adjusted by changing the numbers of grooves 33A and passageways 34 and 35, respectively. The lubricant that flows through the grooves 33A that are not connected to passageways 34 or 35, together with any lubricant that is not pumped into passageways 34 and 35 from the grooves 33A connected thereto, is pumped into the annular groove 38 and thence flows through the grooves 33B. The larger depth of the grooves 33B makes it possible to receive the lubricant and facilitates flow of the lubricant through the passageways 36 to the rightward side of the retainer 22 due to the centrifugal force generated by the rotation of shaft 28. Excess lubricant that flows through the grooves 33B that are not connected to passageways 36 and any lubricant that is not pumped into passageways 36 from the grooves 33B connected thereto, cools the inner race 23 of the bearing and escapes through the grooves 37 in the locknut 30. Hence, by selecting the appropriate numbers of grooves 33A and 33B, and passageways 34, 35 and 36 in the rings 23A and 23B, a given oil flow to the bearing can be proportioned for lubricating desired bearing locations and cooling the bearing rings.

The operation of the embodiment of FIG. 5 is similar, except that the passageways 34 and 36 of FIGS. 6–8 and their corresponding functions are omitted.

Although particular preferred embodiments of the invention have been disclosed in detail for illustrative purposes, it will be recognized that variations and modifications of the disclosed apparatus, including the rearrangement of parts, lie within the scope of the present invention.

The embodiments of the invention in which an exclusive property or privilege is claimed are defined as follows:

1. In a split-inner-ring ball bearing comprising an outer ring having an outer ball raceway, an inner ring comprised of two annular, adjacent, ring parts which mate to define an inner ball raceway, a plurality of bearing balls located between said inner and outer rings and disposed in said raceways for rolling therealong and a bearing ball retainer located between said inner and outer rings for retaining or spacing said bearing balls, the improvement which comprises: both of said inner ring parts have a plurality of circumferentially spaced apart, axially extending grooves in the radially inner surfaces thereof, a lubricant supply for supplying lubricant to said grooves in one said ring part, said ring parts have abutting adjacent axial end surfaces forming a radially inner annular chamber located between them out of communication with said inner ball raceway but in communication with the adjacent axial ends of the grooves in both ring parts so that lubricant flowing from the grooves in said one ring part flows into said chamber and thence into the grooves in the other ring part, said one ring part having one or a plurality of first passageways extending outwardly from a selected one or ones of said grooves therein to the inner ball raceway for intercepting a portion of the lubricant flowing in the grooves of said one ring part before it reaches said radially inner annular chamber and the grooves of the other ring part.

2. A split-inner-ring ball bearing as claimed in claim 1 in which one of said ring parts has one or a plurality of second passageways extending outwardly from a selected one or ones of said grooves therein to the radially outer surface of said one ring part adjacent the radially inner side of said ball retainer on one axial side of said bearing balls, and the other of said ring parts has one or a plurality of third passageways extending outwardly from a selected one or ones of said grooves therein to the radially outer surface of said other ring part adjacent the radially inner side of said ball retainer on the other axial side of said bearing balls.

3. A split-inner-ring ball bearing as claimed in claim 1 or claim 2 in which said first passageway is placed at an angle with the abutting adjacent axial end surfaces of said ring parts and extends outwardly from its associated groove partway to the inner ball raceway, and an outer radially extending pocket extending from the outer end of said first passageway to said inner ball raceway, said pocket being formed in the axial end surface of said one ring part radially outwardly from said chamber.

4. A split-inner-ring ball bearing as claimed in claim 3 in which the outer radially extending pocket is an annular cavity being formed by either one or both adjacent axial end surfaces.

5. A split-inner-ring ball bearing as claimed in claim 1 or claim 2 in which said lubricant supply is an annular manifold located at the outer axial end of said one ring part and communicating with all of said grooves in said one ring part.

6. A split-inner-ring ball bearing as claimed in claim 2 in which each of said first, second and third passageways communicates with only one groove, said first and second passageways communicate with different grooves in said one ring part and the number of first and second passageways is smaller than the number of grooves in said one ring part.

7. A split-inner-ring ball bearing as claimed in claim 6 in which the number of said third passageways is the same as the number of grooves in said other ring part.

8. A split-inner-ring ball bearing as claimed in claim 6 in which the number of grooves in said other ring part is greater than the number of said third passageways and including means communicating with the axially outer ends of said grooves in said other ring part for discharging lubricant from said bearing.

9. A split-inner-ring ball bearing as claimed in claim 1, in which said lubricant supply connects to said grooves of said one ring part axially remotely from said radially inner annular chamber, said first passageways extending from said one or ones of said grooves in said one ring part being spaced between said lubricant supply and said radially inner annular chamber, such that different portions of the lubricant flowing into said grooves in said one ring part respectively flow therefrom to said first passageways and to said radially inner annular chamber.

10. A split-inner-ring ball bearing as claimed in claim 9, including means at the outer axial end of the grooves in said second ring part permitting escape of a portion of said lubricant from said bearing, after flowing sequentially through said axial grooves in said one and other ring parts to cool same, such that said escaping portion is made available for further use in cooling and/or lubricating further components downstream of said bearing.

11. A split-inner-ring ball bearing as claimed in claim 1, in which the radial outward extent of the radially inner annular chamber exceeds that of said grooves in said one ring part from which said chamber receives lubricant.

12. A split-inner-ring ball bearing as claimed in claim 11, wherein a said groove enlarges in cross-section from its end nearest said lubricant supply to its end farthest from said lubricant supply.

13. A split-inner-ring ball bearing as claimed in claim 1, wherein the number of axially extending grooves in said one ring part exceeds the number of said first passageways therein and exceeds the number of axially extending grooves in said other ring half.

14. In a split-inner-ring ball bearing comprising an outer ring having an outer ball raceway, an inner ring comprised of two annular, adjacent, ring parts which mate to define an inner ball raceway, a plurality of bearing balls located between said inner and outer rings and disposed in said raceways for rolling therealong and a bearing ball retainer located between said inner and outer rings for retaining or spacing said bearing balls, the improvement which comprises: both of said inner ring parts have a plurality of circumferentially spaced-apart, axially extending grooves in the radially inner surfaces thereof, said ring parts have abutting adjacent axial end surfaces forming a radially inner annular chamber located between them, which communicates with the adjacent axial ends of the grooves in both ring parts so that lubricant flowing from the grooves in one ring part flows into said chamber and thence into the grooves in the other ring part, and one of the ring parts has one or a plurality of first passageways extending outwardly from a selected one or ones of said grooves therein to the inner ball raceway, and a lubricant supply for supplying lubricant to said grooves, wherein the radial depth of said grooves in said other ring part is larger than the radial depth of said grooves in said one ring part.

* * * * *